UNITED STATES PATENT OFFICE.

SAMUEL LEVINSON, OF BROOKLYN, NEW YORK.

MOUTH TOILET PREPARATION.

1,275,275. Specification of Letters Patent. Patented Aug. 13, 1918.

No Drawing. Application filed June 19, 1915. Serial No. 35,120.

*To all whom it may concern:*

Be it known that I, SAMUEL LEVINSON, a citizen of the United States, and resident of Brooklyn, in the county of Kings and State of New York, have invented certain new and useful Improvements in Mouth Toilet Preparations, of which the following is a specification.

This invention relates to improvements in mouth toilet preparations, and may be embodied either in tooth pastes, tooth powders or mouth washes as hereinafter described. In accordance with my invention, I provide mouth toilet preparations containing a free fruit acid or free fruit acid salt which, when placed in the mouth, will stimulate an increased flow of saliva in the mouth with a subsequent increased alkalinity of same. The acid action of these preparations will also inhibit the formation of coating surfaces on the teeth, which become foci of bacterial infection.

Dental preparations in accordance with my invention contain fruit acid or fruit acid salt in a free state when placed in the mouth, and the remaining ingredients of said preparations are such as not to combine with said acid prior to use, nor (with certain exceptions hereinafter noted) to interfere with the free action of said acid to produce a simple chemical reaction in the mouth, with a direct action on the teeth and salivary glands, instead of producing secondary substances intended to act on the teeth.

In accordance with a further feature of my invention I employ a special flavoring for dental preparations, said flavoring consisting of fruit oils or flavors, such as lemon oil, orange oil, etc. Such oils, especially when used in connection with mouth toilet preparations employing a free fruit acid or acid salt as described above, produces the effect of a fruit juice as regards flavor and taste, making the use of my improved preparations extremely pleasant.

A preferred tooth paste in accordance with my invention may consist of an inert base, such as china clay, kaolin, white earth, white bole, talcum or any other base not affected by the free fruit acid. Care should be taken not to use the alkaline bases generally employed in tooth pastes and powders. This inert base may constitute about 45 to 50% of the total mixture. To this is added 1 to 2% of a free fruit acid, such as citric acid, tartaric acid, acetic acid, malic acid, etc., also I may add an acid salt, such as acid potassium tartrate, sodium benzoate, sodium citrate, etc. Any suitable flavoring may be employed, although, as stated above, I prefer to employ fruit flavors such as orange oil, lemon oil, etc. This flavoring matter may constitute about one-half to one per cent. of the paste. The binder may consist of glycerin, sugar, glucose, paraffin oil or white mineral jelly, gelatin or other vegetable mucilages, it being understood that for the purposes of my invention any suitable binder or flavor may be employed.

A mouth toilet preparation consisting of a mouth wash in accordance with a preferred form of my invention may contain substantially the same ingredients as the tooth paste, but instead of the base and binder there employed, I provide a mixture of the free acid or acid salt and flavoring matter in a solution of water or a solution of water and alcohol. I may sometimes add to this a sweetening compound such as saccharin and a suitable antiseptic.

A tooth powder in accordance with a preferred form of my invention may consist of substantially the same ingredients as the tooth paste described above, but with the binder omitted, and I prefer to employ about one to two per cent. of citric or tartaric acid, which acids, being in dry form, are especially adapted for use in my improved tooth powder. Fruit acid salts may also be used in place of, or in addition to the free acids.

I may, though not necessarily, add about 2% to 3% of sodium perborate or other perborate to the tooth powder which will incidentally result in the liberation of free hydrogen peroxid in the mouth under the action of the free acid. The free acid is used in such proportion relative to the perborate that its action on the saliva and alkaline coatings on the teeth is not interfered with, in other words, in this case the free acids have a direct action on the teeth and saliva, and a secondary action in producing the hydrogen peroxid which subsequently acts as a disinfectant on the mouth and teeth in well-known manner.

I may, in certain cases, add to the above preparations a suitable quantity of a powdered abrasive agent such as powdered pumice, mica, glass powder or the like.

It will be understood from the above that the present invention provides a toilet preparation which employs free fruit acid ordinarily obtainable in commerce, that is, the ordinary commercial fruit acids; and that the toilet preparation is capable of standardization, that is, it is possible to determine the actual amount of fruit acid present so as to obtain the results desired so far as the action of the acid is concerned. A preferred form of tooth-paste in accordance with the invention consists of the following ingredients:

About 60% of kaolin, and about 0.75% of citric acid along with a binder and flavoring matter. I prefer to use less than one per cent. of the fruit acid or fruit acid salt. Though the use of a larger proportion up to about two per cent. is not objectionable. The term "fruit acid" as used in the claims is intended to include also the salts of fruit acids.

It will be understood that the ingredients and proportions given above are by way of example only, and that various changes and modifications may be made without departing from the spirit and scope of my invention.

What I claim is:—

1. A mouth toilet preparation including a substantial amount but not exceeding two per cent. of a free fruit acid of such character as to stimulate an increased flow of saliva, and a non-alkaline base inert to the action of acid.

2. A mouth toilet preparation as claimed in claim 1 in which the base is an unctuous clayey material.

Signed at New York in the county of New York and State of New York this 17th day of June A. D. 1915.

SAMUEL LEVINSON.

Witnesses:
 H. B. LANGNER,
 M. A. EGAN.